United States Patent
Rambo et al.

(10) Patent No.: US 12,270,342 B1
(45) Date of Patent: Apr. 8, 2025

(54) THERMAL MANAGEMENT SYSTEM FOR AN ENGINE

(71) Applicant: General Electric Company, Schenectady, NY (US)

(72) Inventors: Jeffrey Douglas Rambo, Mason, OH (US); Eric Barre, Cincinnati, OH (US); Brandon Wayne Miller, Liberty Township, OH (US); Leonardo Aguilar Willys, Queretaro (MX); Victor Moreno Patan, Queretaro (MX)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/483,620

(22) Filed: Oct. 10, 2023

(51) Int. Cl.
*F02C 7/14* (2006.01)
*F02C 7/224* (2006.01)

(52) U.S. Cl.
CPC ............ *F02C 7/224* (2013.01); *F02C 7/14* (2013.01); *F05D 2260/213* (2013.01); *F05D 2260/232* (2013.01); *F05D 2260/98* (2013.01); *F05D 2270/303* (2013.01)

(58) Field of Classification Search
CPC .......... F05D 2260/98; F05D 2260/213; F05D 2260/232; F05D 2270/303; F02C 7/14; F02C 7/224
See application file for complete search history.

(56) References Cited

U.S. PATENT DOCUMENTS

| | | | |
|---|---|---|---|
| 3,779,345 A * | 12/1973 | Barnes | F01M 1/18 60/39.08 |
| 5,610,341 A | 3/1997 | Tortora | |
| 7,997,062 B2 | 8/2011 | Sun et al. | |
| 8,205,427 B2 | 6/2012 | Schwarz et al. | |
| 8,257,024 B1 | 9/2012 | Phillips et al. | |
| 8,261,527 B1 | 9/2012 | Stearns et al. | |
| 9,038,397 B2 | 5/2015 | Papa et al. | |
| 9,823,030 B2 | 11/2017 | Veilleux, Jr. | |
| 10,041,409 B2 | 8/2018 | Snyder et al. | |
| 10,400,671 B2 | 9/2019 | Papa et al. | |
| 10,612,860 B2 | 4/2020 | Ribarov et al. | |
| 2008/0110596 A1 * | 5/2008 | Schwarz | F01D 25/08 165/104.11 |

* cited by examiner

*Primary Examiner* — Todd E Manahan
*Assistant Examiner* — Rodolphe Andre Chabreyrie
(74) *Attorney, Agent, or Firm* — Dority & Manning, P.A.

(57) ABSTRACT

A thermal management system includes a thermal circuit having a thermal transport bus with a thermal fluid flowing therethrough. The thermal transport bus includes first and second bus segments. First and second thermal loads are on the first and second bus segments, respectively, and have different first and second inlet temperature requirements. The thermal management system includes a plurality of heat exchangers in thermal communication with the first and second thermal loads. The heat exchangers include a first heat exchanger and one or more second heat exchangers. The first heat exchanger is on one of the first or second bus segments for rejecting heat to engine fuel. The thermal fluid is split between each of the first and second bus segments such that only a portion of the thermal fluid flows through the first heat exchanger to accommodate the different first and second inlet temperature requirements.

14 Claims, 4 Drawing Sheets

THERMAL MANAGEMENT SYSTEM FOR AN ENGINE

FIELD

The present disclosure relates generally to gas turbine engines, and more particularly to a thermal management system for a gas turbine engine.

BACKGROUND

Gas turbine engines typically include an inlet, a fan, one or more compressors, a combustor, and at least one turbine. The compressors compress air which is channeled to the combustor where it is mixed with fuel. The mixture is then ignited to generate hot combustion gases. The combustion gases are channeled to the turbine(s) which extracts energy from the combustion gases for powering the compressor(s), as well as for producing useful work to propel an aircraft in flight or to power a load, such as an electrical generator.

During operation of the gas turbine engine, various systems may generate a relatively large amount of heat. Thermal management systems of the gas turbine engine may collect heat from one or more of these systems to maintain a temperature of such systems within an acceptable operating range. The thermal management systems may remove or expel such heat through one or more heat exchangers. In at least certain embodiments, at least one of the heat exchangers may be integrated into one or more components exposed to the bypass airflow passage, such as one or more struts extending between the turbomachine and the outer nacelle.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
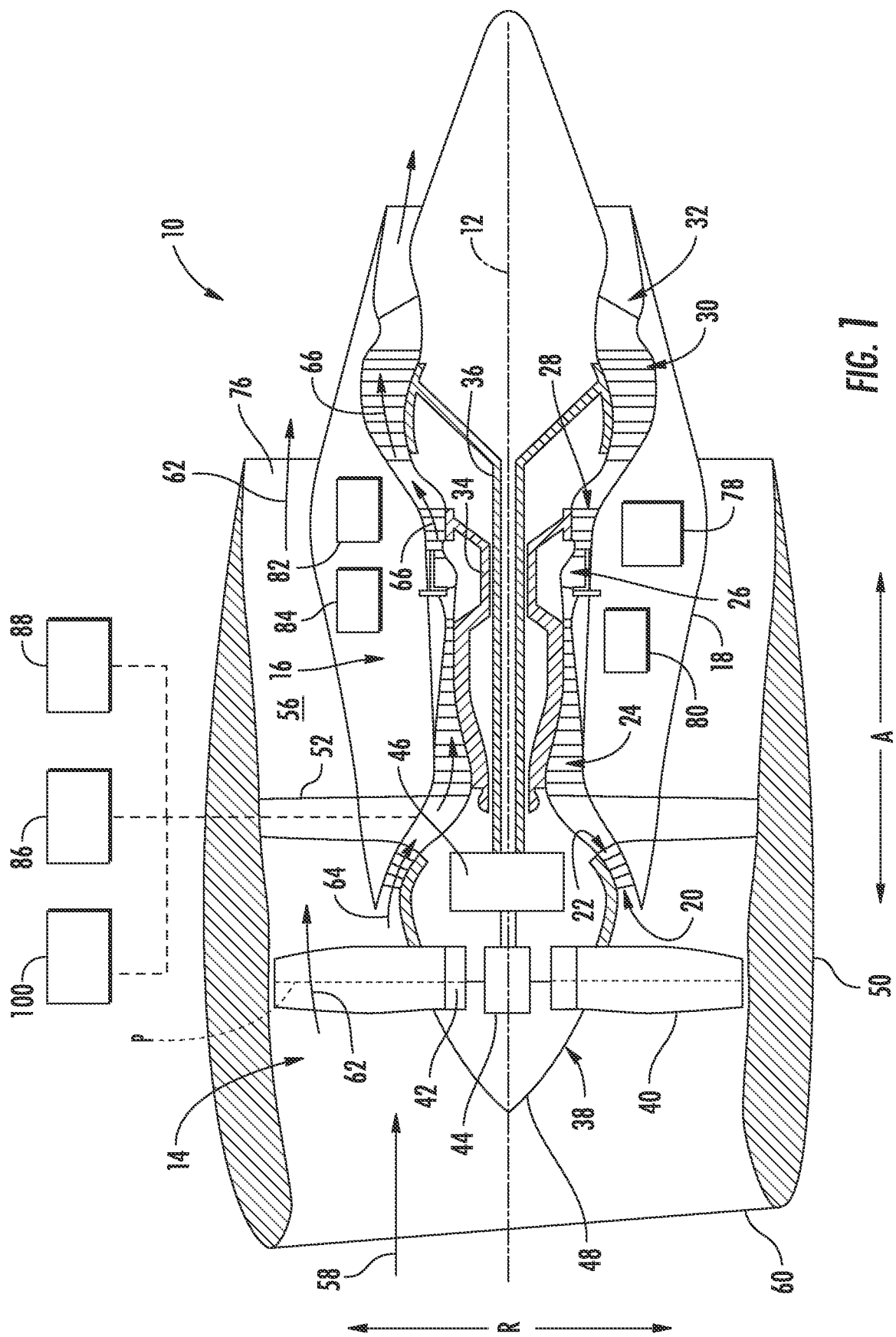
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "first", "second", and so on may be used interchangeably to distinguish one component from another and are not intended to signify location or importance of the individual components.

The term "coupled" and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term "turbomachine" or "turbomachinery" refers to a machine that transfers power between a fluid and a rotating shaft, such as a compressor or pump that transfers work from a shaft to the fluid or as a turbine that extracts power from a fluid to turn a shaft.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

Conventional thermal management systems cooled oil in the system to the lowest required temperature and did not maximize oil heat rejection to fuel flow. As such, conventional thermal management systems generally included over-sized air-cooled oil heat exchangers that increased fan duct pressure losses. Accordingly, the present disclosure is directed to an improved fuel-oil thermal management system for a gas turbine engine. In an embodiment, for example, the fuel-oil thermal management system includes a thermal circuit having a thermal transport bus with a thermal fluid flowing therethrough. The thermal transport bus includes a plurality of bus segments, such as at least a first bus segment and a second bus segment. As such, the fuel-oil thermal management system has improved cooling by branching the system between the plurality of bus segments to different air-cooled oil heat exchangers and fuel-cooled oil heat exchangers to efficiently satisfy different oil temperature inlet requirements to various engine components, such as the engine bearings and reduction gearbox. In an embodiment, the fuel-oil thermal management system is also configured to actively modulate oil flow to maximize use of a fuel heat sink (also referred to herein as a fuel-cooled heat exchanger) throughout mission and reduce overall airflow required to air-cooled oil heat exchangers.

Referring now to the drawings, wherein identical numerals indicate the same elements throughout the figures, FIG. 1 is a schematic, cross-sectional view of a gas turbine engine in accordance with an exemplary embodiment of the present disclosure. More particularly, for the embodiment of FIG. 1, the gas turbine engine is a high-bypass turbofan jet engine, referred to herein as "turbofan engine 10." As shown in FIG. 1, the turbofan engine 10 defines an axial direction A (extending parallel to a longitudinal centerline 12 provided for reference) and a radial direction R. In general, the turbofan engine 10 includes a fan section 14 and a turbomachine 16 disposed downstream from the fan section 14.

Furthermore, the turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft 34 drivingly connects the HP turbine 28 to the HP compressor 24. A low pressure (LP) shaft 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from the disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal centerline 12 by LP shaft 36 across a power gear box 46. The power gear box 46 includes a plurality of gears for stepping down the rotational speed of the LP shaft 36 to a more efficient rotational fan speed.

Referring still to FIG. 1, the disk 42 is covered by a rotor spinner 48 aerodynamically contoured to promote an airflow through the plurality of fan blades 40. Additionally, the fan section 14 includes an annular fan casing or outer nacelle 50 that circumferentially surrounds the fan 38 or at least a portion of the turbomachine 16. The outer nacelle 50 is supported relative to the turbomachine 16 by a plurality of circumferentially spaced outlet guide vanes 52. Moreover, the outer nacelle 50 extends over an outer portion of the turbomachine 16 so as to define a bypass airflow passage 56 therebetween.

During operation of the turbofan engine 10, a volume of air 58 enters the turbofan engine 10 through an associated inlet 60 of the outer nacelle 50 or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66. Subsequently, the combustion gases 66 are routed through the HP turbine 28 and the LP turbine 30, where a portion of thermal or kinetic energy from the combustion gases 66 is extracted.

The combustion gases 66 are then routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan engine 10, also providing propulsive thrust.

Moreover, as is depicted schematically, the turbofan engine 10 further includes various accessory systems to aid in the operation of the turbofan engine 10 or an aircraft including the turbofan engine 10. For example, the turbofan engine 10 includes a main lubrication system 78 configured to provide a lubricant to, e.g., various bearings and gear meshes in the compressor section (including the LP compressor 22 and HP compressor 24), the turbine section (including the HP turbine 28 and the LP turbine 30), the HP shaft 34, the LP shaft 36, and the power gear box 46. The lubricant provided by the main lubrication system 78 may increase the useful life of such components and may remove a certain amount of heat from such components. Additionally, the turbofan engine 10 may include a cooled cooling air (CCA) system 80 for providing air from one or both of the HP compressor 24 or LP compressor 22 to one or both of the HP turbine 28 or LP turbine 30. Moreover, the turbofan engine 10 may include an active thermal clearance control (ACC) system 82 for cooling a casing of the turbine section to maintain a clearance between the various turbine rotor blades 40 and the turbine casing within a desired range throughout various engine operating conditions. Furthermore, the turbofan engine 10 includes a generator lubrication system 84 for providing lubrication to an electric power generator, as well as cooling/heat removal for the generator. The generator may provide electrical power to, e.g., a startup electric motor for the turbofan engine 10 or various other electronic components of the turbofan engine 10 or an aircraft including the turbofan engine 10.

As is also depicted schematically, the turbofan engine 10 drives or enables various other accessory systems, e.g., for an aircraft including the turbofan engine 10. For example, the turbofan engine 10 may provide compressed air from the compressor section to an environmental control system (ECS) 86. The ECS 86 may provide an air supply to a cabin of the aircraft for pressurization and thermal control. Additionally, air may be provided from the turbofan engine 10 to an electronics cooling system 88 for maintaining a temperature of certain electronic components of the turbofan engine 10 or aircraft within a desired range.

It should be appreciated, however, that the turbofan engine 10 depicted in FIG. 1 is by way of example only, and that in other exemplary embodiments, aspects of the present disclosure may additionally, or alternatively, be applied to any other suitable gas turbine engine. For example, in other exemplary embodiments, the turbofan engine 10 may instead be any other suitable aeronautical gas turbine engine, such as a turbojet engine, turboshaft engine, turboprop engine, etc. Additionally, in still other exemplary embodiments, the turbofan engine 10 may include or be operably connected to any other suitable accessory systems. Additionally, or alternatively, the turbofan engine 10 may not include or be operably connected to one or more of the accessory systems discussed above.

Figure 2:
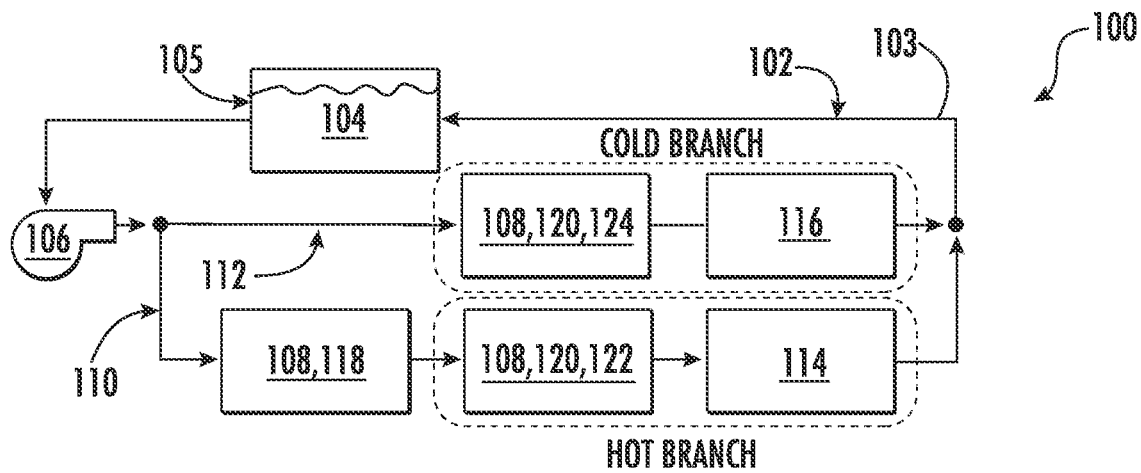
FIG. 2 is a simplified schematic view of a thermal management system in accordance with an exemplary embodiment of the present disclosure.
Figure 3:
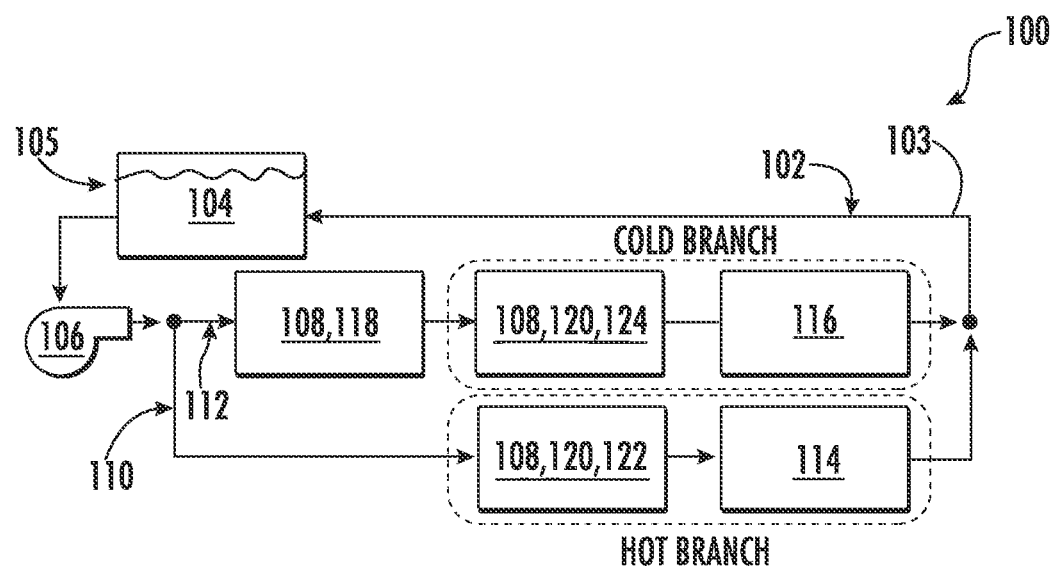
FIG. 3 is a simplified schematic view of a thermal management system in accordance with another exemplary embodiment of the present disclosure.

Referring now to FIGS. 1-3, the turbofan engine 10 further includes a thermal management system 100 for transferring heat from some or all of such accessory systems to remove such heat more efficiently or utilize such heat. More specifically, FIGS. 2 and 3 illustrate schematic diagrams of embodiments of the thermal management system 100 according to the present disclosure for incorporation at least partially into the turbofan engine 10 described herein.

As shown in FIGS. 2 and 3, the thermal management system 100 generally includes a thermal circuit 102 having a thermal transport bus 103, a thermal fluid tank 105, and a pump 106 for storing and circulating a thermal fluid 104 through the thermal circuit 102 to and from the thermal fluid tank 105. Thus, in an embodiment, the thermal management system 100 is a fuel-oil thermal management system and the thermal fluid 104 is an oil-based lubricant. Furthermore, in an embodiment, the thermal transport bus 103 may be formed of one or more suitable fluid conduits.

The pump 106 is provided in flow communication with the thermal fluid 104 in the thermal transport bus 103 for generating a flow of the thermal fluid 104 in or through the thermal transport bus 103. As viewed in FIGS. 2 and 3, the pump 106 may generate a flow of the thermal fluid 104 generally in a clockwise direction through the thermal transport bus 103. The pump 106 may be a rotary pump including an impeller, or alternatively may be any other suitable fluid pump. Additionally, the pump 106 may be powered by an electric motor, or alternatively may be in mechanical communication with and powered by, e.g., the HP shaft 34 or the LP shaft 36 of the turbofan engine 10. In still other embodiments, the pump 106 may be powered by an auxiliary turbine, which in turn may be powered by bleed air from a compressor section of a gas turbine engine within which the thermal management system 100 is incorporated.

Still referring to FIGS. 2 and 3, the thermal transport bus 103 further includes a plurality of bus segments. In particular, as shown, the plurality of bus segments may include, at least, a first bus segment 110 and a second bus segment 112. Further, as shown, the first bus segment 110 and the second bus segment 112 of the illustrated embodiments of FIGS. 2 and 3 are bus branches that provide a split of flow of the thermal fluid 104. In certain embodiments, for example, the flow is physically split between the bus branches based on the respective flow resistance within each bus branch. In particular, the first and second bus branches each define tubes that can be sized and/or may contain restrictions (such as orifice plates, etc.) to control the resistance and meter the flow between the different bus branches so as to provide the desired split of flow.

Furthermore, as shown, the thermal circuit 102 includes a first thermal load 114 on the first bus segment 110 and having a first inlet temperature requirement. In addition, as shown, the thermal circuit 102 includes a second thermal load 116 on the second bus segment 112 and having a second inlet temperature requirement. Thus, in an embodiment, the first and second inlet temperature requirements are different. For example, in an embodiment, the first inlet temperature requirement of the first thermal load 114 is higher than the second inlet temperature requirement of the second thermal load 116. In particular embodiments, for example, the first inlet temperature requirement is at least 5 degrees Fahrenheit (° F.) higher than the second inlet temperature, such as at least 10° F., such as at least 20° F. Moreover, in an embodiment, the second thermal load 116 is at least 60% of the first thermal load 114. Further, in an embodiment, the second thermal load 116 is at least 40% of a total oil-based lubricant thermal load.

Thus, in certain embodiments, the first thermal load 114 may be a reduction gearbox, a variable frequency generator, one or more sumps, an accessory gearbox, or an oil-to-oil heat exchanger. Further, in an embodiment, the second thermal load 116 may be a different one of the reduction gearbox, the variable frequency generator, the one or more sumps, the accessory gearbox, or the oil-to-oil heat exchanger. In particular embodiments, for example, the sump(s) described herein may be part of the main lubrication system 78 for providing lubrication to a component of the turbofan engine 10. For example, in an embodiment, the component may be a compressor section or a turbine section of the turbofan engine 10. Accordingly, in an exemplary embodiment, the first thermal load 114 may be the sump(s) of the main lubrication system 78, whereas the second thermal load 116 may be the reduction gearbox.

Referring still to FIGS. 2 and 3, the thermal management system 100 includes one or more heat exchangers 108 in thermal communication with the thermal fluid 104 in the thermal transport bus 103, as well as the first and second thermal loads 114, 116. Specifically, the thermal circuit 102 depicted includes a plurality of heat exchangers 108. More specifically, for the embodiment depicted, there are three heat exchangers 108. However, in other exemplary embodiments, any other suitable number of heat exchangers 108 may be included and one or more of the heat exchangers 108 may be arranged in serial flow or parallel flow order along the thermal transport bus 103. For example, in other embodiments, there may be at least four heat exchangers 108, at least five heat exchangers 108, or at least six heat exchangers 108 in thermal communication with thermal fluid 104 in the thermal transport bus 103.

The plurality of heat exchangers 108 are configured to transfer heat from one or more of the accessory systems of the turbofan engine 10 (or in operable communication with the turbofan engine 10) to the thermal fluid 104 in the thermal transport bus 103. For example, in certain embodiments, the plurality of heat exchangers 108 may include one or more of: an air-cooled oil cooler for transferring oil heat to an airstream, a fuel-cooled oil cooler for transferring oil heat to a fuel stream, an oil-cooled oil cooler for transfer oil heat from one oil stream to a stream of oil at a lower temperature, or similar, or combinations thereof.

More specifically, as shown in FIGS. 2 and 3, the plurality of heat exchangers 108 may include a first heat exchanger 118 and one or more second heat exchangers 120. For example, in an embodiment, the first heat exchanger 118 is a fuel-cooled heat exchanger, such as a fuel-cooled oil cooler, and the second heat exchanger(s) 120 is an air-cooled heat exchanger, such as an air-cooled oil cooler. In particular embodiments, as shown, the second heat exchanger(s) 120 include a first air-cooled heat exchanger 122 and a second air-cooled heat exchanger 124. Accordingly, in an embodiment, the thermal fluid 104 flows to each of the first and second bus segments 110, 112 such that only a portion of the thermal fluid 104 flows through the first heat exchanger 118.

Moreover, as shown in FIGS. 2 and 3, the first heat exchanger 118 is upstream of the second heat exchangers 120 such that the heat is rejected to the engine fuel of the turbofan engine 10 by the first heat exchanger 118 prior to being cooled by the second heat exchanger(s) 120. More specifically, in an embodiment, as shown in FIG. 2, the first heat exchanger 118 is on first bus segment 110 for rejecting heat to the engine fuel of the turbofan engine 10. In such embodiments, as shown, the first bus segment 110 may correspond to a "hot" branch in that components (e.g., the sumps) on the hot branch require or are capable of using higher temperature lubricating oil and may be designated as higher temperature components. Further, as shown, the second bus segment 112 may correspond to a "cold" branch in that lower temperature components (e.g., the reduction gearbox) are on the second bus segment 112. Accordingly, the first heat exchanger 118 being on the hot branch maximizes heat to fuel, thereby reducing the size of the first air-cooled heat exchanger 122. Such embodiments can be beneficial if the hot branch thermal load (e.g., the first thermal load 114) is greater than the cold branch thermal load (e.g., the second thermal load 116).

In another embodiment, as shown in FIG. 3, the first heat exchanger 118 is on the second bus segment 112 for rejecting heat to engine fuel of the turbofan engine 10. In such embodiments, the first heat exchanger 118 being on the cold branch minimizes the size of the second air-cooled heat exchanger 124. Such embodiments can be beneficial if the cold branch thermal load (e.g., the second thermal load 116) is greater than the hot branch thermal load (e.g., the first thermal load 114).

Accordingly, the first heat exchanger 118 is configured for transferring heat from the thermal fluid 104 in the thermal transport bus 103, e.g., to atmosphere, to fuel, to a fan stream, etc. For example, in certain embodiments, the first heat exchanger 118 may include at least one of a ram heat exchanger, a fuel heat exchanger, a fan stream heat exchanger, a bleed air heat exchanger, an engine intercooler, or a cold air output of an air cycle system. As used herein, a ram heat exchanger generally refers to a heat exchanger that uses forward motion to increase pressure to drive flow. Thus, in an embodiment, the ram heat exchanger may be a heat exchanger located in a duct where the vehicle's forward motion (e.g., flight speed) drives air flow through the duct and heat exchanger. The ram heat exchanger may be configured as an "air to thermal fluid" heat exchanger integrated into one or both of the turbofan engine 10 or an aircraft including the turbofan engine 10. During operation, the ram heat exchanger may remove heat from any thermal fluid 104 therein by flowing a certain amount of RAM air over the ram heat exchanger. Additionally, the first heat exchanger 118 may be a "fluid to thermal fluid" heat exchanger wherein heat from the thermal fluid 104 is transferred to a stream of liquid fuel for the turbofan engine 10. Moreover, the fan stream heat exchanger is generally an "air to thermal fluid" heat exchanger which flows, e.g., bypass air over thermal fluid 104 to remove heat from the thermal fluid 104. Further, the bleed air heat exchanger is generally an "air to thermal fluid" heat exchanger which flows, e.g., bleed air from the LP compressor 22 over thermal fluid 104 to remove heat from the thermal fluid 104. In another embodiment, the first heat exchanger 118 may be a "fan stream air" heat exchanger which generally refers to a heat exchanger that resides in the fan stream or are cooled by extracting air from the fan stream and directing the air towards the heat exchanger.

Figure 4:
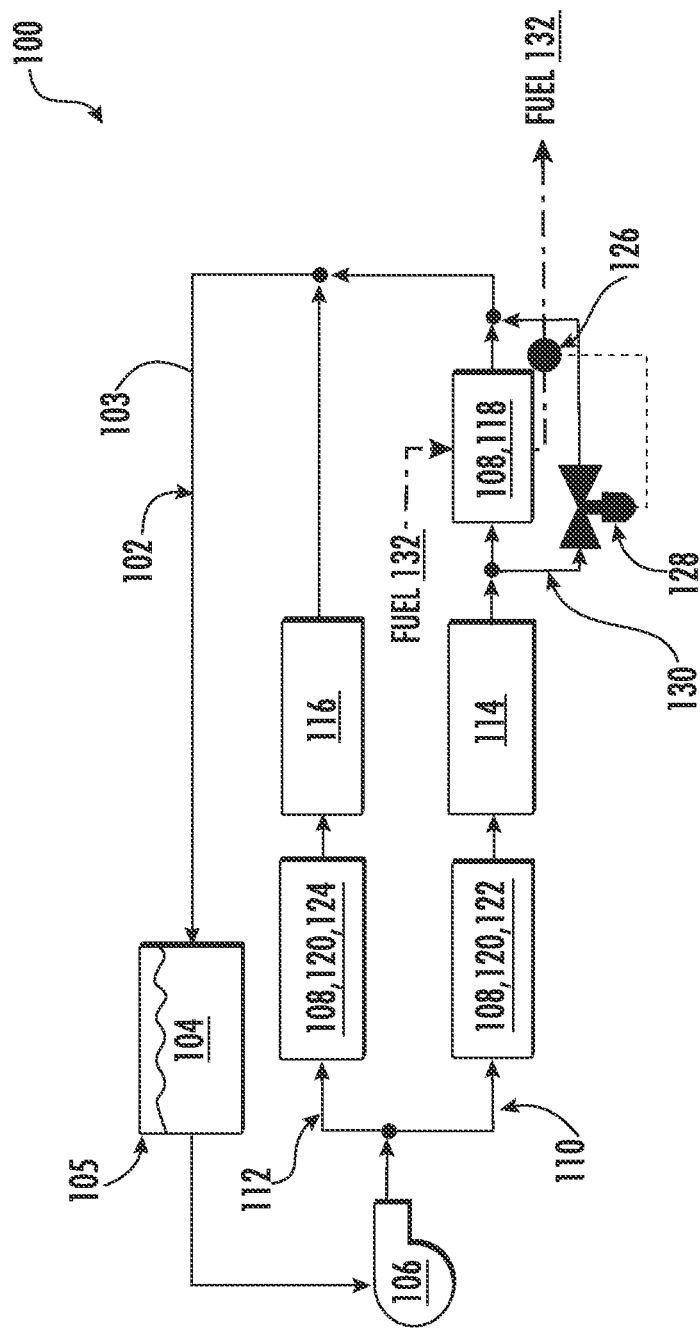
FIG. 4 is a simplified schematic view of a thermal management system in accordance with another exemplary embodiment of the present disclosure.

Referring now to FIG. 4, wherein identical numerals indicate the same elements as those in FIGS. 2 and 3, a schematic diagram of an embodiment of the thermal management system 100 according to the present disclosure for incorporation at least partially into the turbofan engine 10 described herein is illustrated. In particular, as shown, the first heat exchanger 118 is downstream of the first thermal load 114 (e.g., the high temperature load) on the first bus segment 110 to maximize the oil heat rejection to fuel. Thus, in such embodiments, the location of the first heat exchanger 118 in FIG. 4 lowers the return temperature to the thermal fluid tank 105 and reduces the thermal load of the second heat exchangers 120.

Furthermore, as shown, the thermal management system 100 includes at least one sensor 126 in thermal communication with the engine fuel flowing through the first heat exchanger 118. For example, as shown, engine fuel 132, e.g., from a boost pump, enters the first heat exchanger 118 at a first temperature and exits the first heat exchanger 118 at a second temperature (e.g., to a main fuel pump, a fuel management unit (FMU), the combustion section 26, etc. In such embodiments, the sensor(s) 126 is configured to measure a temperature of the engine fuel 132. In addition, as shown, the plurality of bus segments of the thermal management system 100 may also include a third bus segment 130 bypassing the first heat exchanger 118 and having a flow control valve 128 for modulating a flow rate of the thermal fluid 104 into the first heat exchanger 118 based on the temperature of the engine fuel 132. It should be further understood that any suitable number of bus segments may be included in the thermal circuit 102 supporting any number of thermal loads.

Figure 5:
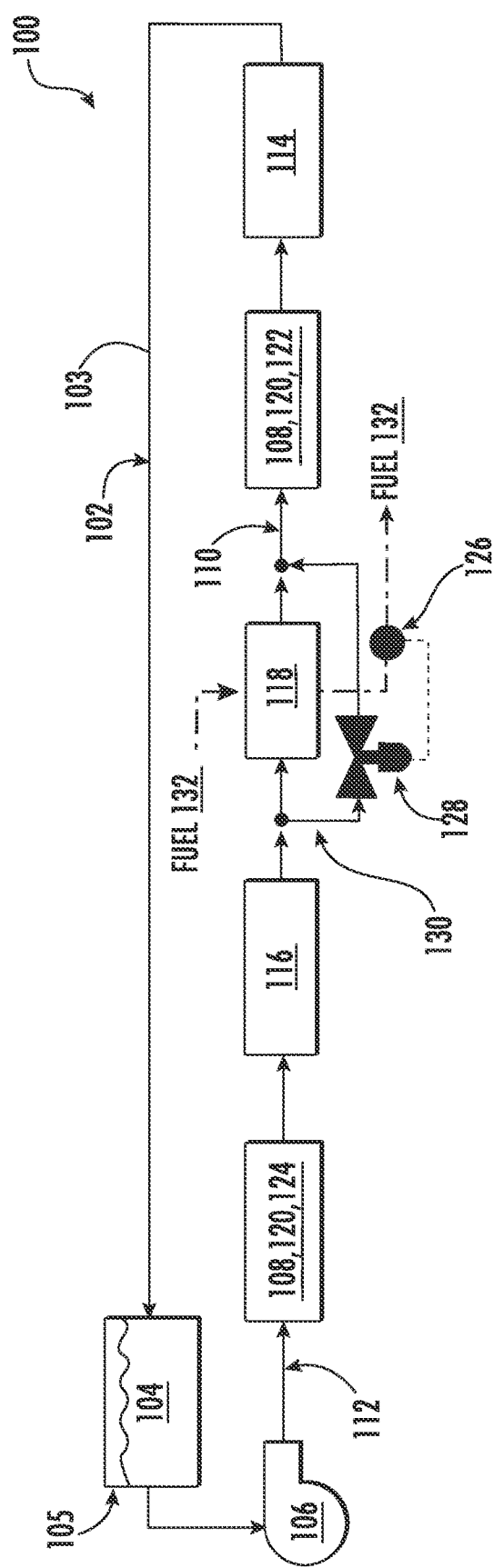
FIG. 5 is a simplified schematic view of a thermal management system in accordance with another exemplary embodiment of the present disclosure.
Figure 6:
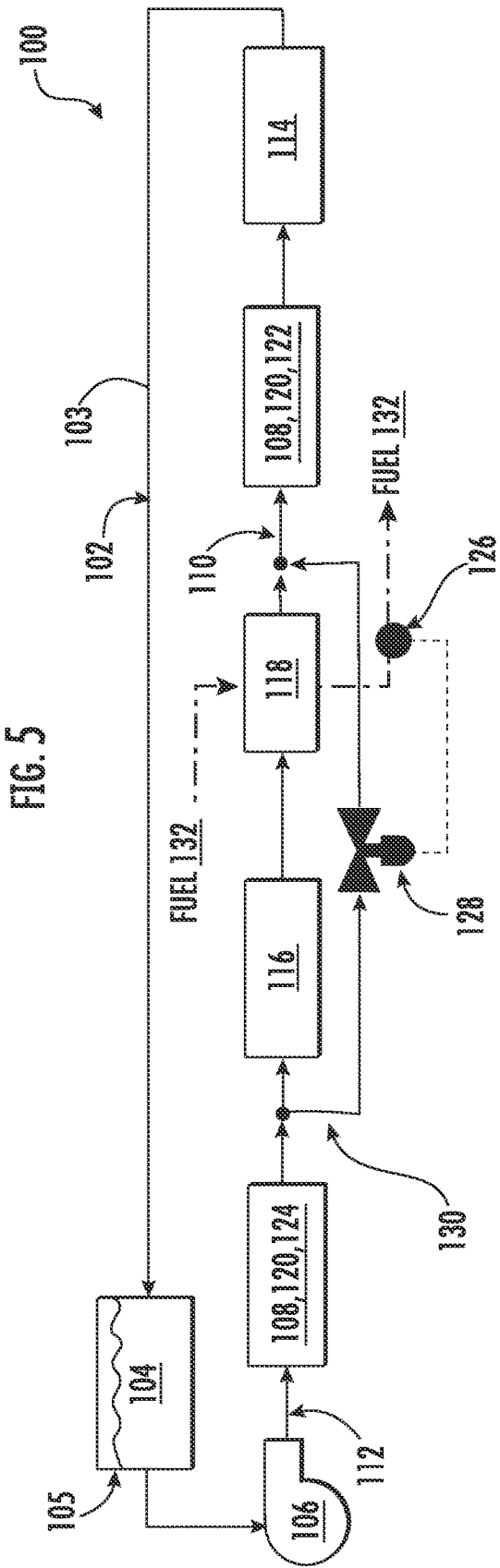
FIG. 6 is a simplified schematic view of a thermal management system in accordance with another exemplary embodiment of the present disclosure.

Referring now to FIGS. 5 and 6, schematic diagrams of embodiments of the thermal management system 100 according to the present disclosure for incorporation at least partially into the turbofan engine 10 described herein are illustrated. In particular, as shown and as previously described, the thermal management system 100 generally includes the thermal circuit 102 having the thermal transport bus 103, the thermal fluid tank 105, and the pump 106 for storing and circulating the thermal fluid 104 through the thermal circuit 102 to and from the thermal fluid tank 105. Thus, in an embodiment, the thermal management system 100 is a fuel-oil thermal management system and the thermal fluid 104 is an oil-based lubricant. Furthermore, in an embodiment, the thermal transport bus 103 may be formed of one or more suitable fluid conduits.

Still referring to FIGS. 5 and 6, the thermal transport bus 103 further includes a plurality of segments, such as the first bus segment 110, the second bus segment 112, and the third bus segment 130. Furthermore, as shown, the first thermal load 114 is on the first bus segment 110 and the second thermal load 116 is on the second bus segment 112. However, in contrast to the embodiments of FIGS. 2 and 3, the first and second bus segments 110, 112 of FIGS. 5 and 6 are arranged in a serial flow arrangement.

In addition, as shown in FIGS. 5 and 6, the thermal management system 100 includes the plurality of heat exchangers 108 in thermal communication with the first and second thermal loads 114, 116. More specifically, as shown, the plurality of heat exchangers 108 include the first heat exchanger 118, such as a fuel-cooled heat exchanger, and the second heat exchangers 120, such as the first air-cooled heat exchanger 122 and the second air-cooled heat exchanger 124.

Moreover, as shown in each of FIGS. 5 and 6, the first heat exchanger 118 is positioned between the first and second bus segments 110, 112 for rejecting heat to engine fuel of the turbofan engine 10. Furthermore, as shown, the third bus segment 130 bypasses the first heat exchanger 118. In addition, as shown in FIGS. 5 and 6 and similar to the embodiment of FIG. 4, the thermal management system 100 includes the flow control valve 128 in the third bus segment 130 for modulating a flow rate of the thermal fluid 104 into the first heat exchanger 118. In an embodiment, as shown in FIG. 5, the third bus segment 130 is positioned downstream of the second thermal load 116 and upstream of the first air-cooled heat exchanger 122. Accordingly, the embodiment of FIG. 5 only requires a single sensor on the fuel stream to control combustor delivery temperature. Alternatively, as shown in FIG. 6, the third bus segment 130 is positioned downstream of the second air-cooled heat exchanger 124 and upstream of the first air-cooled heat exchanger 122. Accordingly, the embodiment of FIG. 6 is configured to modulate the low temperature load flow as a separate actively controlled bypass valve.

Accordingly, in an embodiment, as shown, the thermal management system 100 may also include at least one sensor 126 in thermal communication with the engine fuel flowing through the first heat exchanger 118. Thus, as mentioned, the sensor(s) 126 is configured to measure a temperature of the engine fuel. In such embodiments, as an example, the flow control valve 128 is configured to modulate the flow rate of the thermal fluid 104 into the first heat exchanger 118 based on the temperature of the engine fuel as measured by the sensor(s) 126.

Thus, in such embodiments, embodiments of FIGS. 5 and 6 are confirmed to increase a temperature of the thermal fluid 104 (e.g., oil temperature) into the first heat exchanger 118 for a larger driving temperature difference to maximize heat rejection rate to the engine fuel 132. Moreover, in an embodiment, the oil stream flow control valve to bypass a portion of the first heat exchanger 118 maximizes oil circuit heat rejection without exceeding fuel temperature limits. In addition, in an embodiment, modulating oil flow rather than fuel flow eliminates extra lag in the fuel flow controller.

Further aspects are provided by the subject matter of the following clauses:

A thermal management system for a gas turbine engine, the thermal management system comprising: a thermal circuit, comprising: a thermal transport bus with a thermal fluid flowing therethrough, the thermal transport bus comprising a first bus segment and a second bus segment; a first thermal load on the first bus segment and having a first inlet temperature requirement; a second thermal load on the second bus segment and having a second inlet temperature requirement, the first and second inlet temperature requirements being different; and a plurality of heat exchangers in thermal communication with the first and second thermal loads, the plurality of heat exchangers comprising a first heat exchanger and one or more second heat exchangers, the first heat exchanger on one of the first bus segment or the second bus segment for rejecting heat to engine fuel of the gas turbine engine, wherein the thermal fluid is split between each of the first and second bus segments such that only a portion of the thermal fluid flows through the first heat exchanger to accommodate the first and second inlet temperature requirements being different.

The thermal management system of any preceding clause, wherein the first heat exchanger is upstream of the one or more second heat exchangers such that the heat is rejected to the engine fuel of the gas turbine engine by the first heat exchanger prior to being cooled by the one or more second heat exchangers.

The thermal management system of any preceding clause, wherein the first inlet temperature requirement of the first thermal load is higher than the second inlet temperature requirement of the second thermal load.

The thermal management system of any preceding clause, wherein the first heat exchanger is downstream of the first thermal load on the first bus segment, the thermal management system further comprising at least one sensor in thermal communication with the engine fuel flowing through the first heat exchanger, the at least one sensor configured to measure a temperature of the engine fuel.

The thermal management system of any preceding clause, further comprising a flow control valve for modulating a flow rate of the thermal fluid into the first heat exchanger based on the temperature of the engine fuel.

The thermal management system of any preceding clause, wherein the first inlet temperature requirement is at least five (5) degrees Fahrenheit (° F.) higher than the second inlet temperature requirement.

The thermal management system of any preceding clause, wherein the first heat exchanger is a fuel-cooled heat exchanger and the one or more second heat exchangers is an air-cooled heat exchanger.

The thermal management system of any preceding clause, wherein the first thermal load is one of a reduction gearbox, a variable frequency generator, one or more sumps, an accessory gearbox, or an oil-to-oil heat exchanger.

The thermal management system of any preceding clause, wherein the second thermal load is one of the reduction gearbox, the variable frequency generator, the one or more sumps, the accessory gearbox, or the oil-to-oil heat exchanger that is different than the first thermal load.

The thermal management system of any preceding clause, wherein the one or more sumps are part of a main lubrication system for providing lubrication to a component of the gas turbine engine, wherein the component is at least one a compressor section or a turbine section of the gas turbine engine.

The thermal management system of any preceding clause, wherein the first thermal load is the one or more sumps of the main lubrication system, and the second thermal load is the reduction gearbox.

The thermal management system of any preceding clause, further comprising a thermal fluid tank and a pump for circulating the thermal fluid through the thermal circuit to and from the thermal fluid tank.

The thermal management system of any preceding clause, wherein the thermal management system is a fuel-oil thermal management system, and the thermal fluid is an oil-based lubricant.

The thermal management system of any preceding clause, wherein at least one of the following parameters are true: the second thermal load is at least 60% of the first thermal load or the second thermal load is at least 40% of a total oil-based lubricant thermal load.

A thermal management system for a gas turbine engine, the thermal management system comprising: a thermal circuit, comprising: a thermal transport bus with a thermal fluid flowing therethrough, the thermal transport bus comprising a first bus segment, a second bus segment, and a third bus segment, the first and second bus segments arranged in a serial flow arrangement; a first thermal load on the first bus segment and having a first inlet temperature requirement; a second thermal load on the second bus segment and having a second inlet temperature requirement, the first and second inlet temperature requirements being different; a plurality of heat exchangers in thermal communication with the first and second thermal loads, the plurality of heat exchangers comprising a first heat exchanger and one or more second heat exchangers, the first heat exchanger positioned between the first and second bus segments for rejecting heat to engine fuel of the gas turbine engine, the third bus segment bypassing the first heat exchanger; and a flow control valve in the third bus segment for modulating a flow rate of the thermal fluid into the first heat exchanger to accommodate the first and second inlet temperature requirements being different.

The thermal management system of any preceding clause, wherein the first inlet temperature requirement of the first thermal load is higher than the second inlet temperature requirement of the second thermal load, and wherein the first heat exchanger comprises a fuel-cooled heat exchanger and the one or more second heat exchangers comprise a first air-cooled heat exchanger and a second air-cooled heat exchanger.

The thermal management system of any preceding clause, wherein the flow control valve is positioned downstream of the second thermal load and upstream of the first air-cooled heat exchanger.

The thermal management system of any preceding clause, wherein the flow control valve is positioned downstream of the second air-cooled heat exchanger and upstream of the first air-cooled heat exchanger.

The thermal management system of any preceding clause, further comprising at least one sensor in thermal communication with the engine fuel flowing through the first heat exchanger, the at least one sensor configured to measure a temperature of the engine fuel, and wherein the flow control valve is configured to modulate the flow rate of the thermal fluid into the first heat exchanger based on the temperature of the engine fuel.

The thermal management system of any preceding clause, wherein the first thermal load is one or more sumps of a main lubrication system, and the second thermal load is a reduction gearbox.

This written description uses examples to disclose the present disclosure, including the best mode, and also to enable any person skilled in the art to practice the disclosure, including making and using any devices or systems. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed:

1. A thermal management system for an engine, the thermal management system comprising:
   a thermal circuit, comprising:
   a thermal transport bus with a thermal fluid flowing therethrough, the thermal transport bus comprising a first bus segment and a second bus segment, the first bus segment comprising a first thermal load having a first inlet temperature requirement, the second bus segment comprising a second thermal load having a second inlet temperature requirement, the first and second inlet temperature requirements being different; and
   a plurality of heat exchangers in thermal communication with the first and second thermal loads, the plurality of heat exchangers comprising a first heat exchanger and a plurality of second heat exchangers, the first heat exchanger on one of the first bus segment or the second bus segment for rejecting heat to engine fuel of the engine, wherein one of the plurality of second heat exchangers is on the first bus segment and another one of the plurality of second heat exchangers is on the second bus segment;
   wherein the thermal fluid is split between each of the first and second bus segments such that only a portion of the thermal fluid flows through the first heat exchanger to accommodate the first and second inlet temperature requirements being different.

2. The thermal management system of claim 1, wherein the first heat exchanger is upstream of the one or more second heat exchangers such that the heat is rejected to the engine fuel of the engine by the first heat exchanger prior to being cooled by the one or more second heat exchangers.

3. The thermal management system of claim 1, wherein the first inlet temperature requirement of the first thermal load is higher than the second inlet temperature requirement of the second thermal load.

4. The thermal management system of claim 1, wherein the first heat exchanger is downstream of the first thermal load on the first bus segment, the thermal management system further comprising at least one sensor in thermal communication with the engine fuel flowing through the first heat exchanger, the at least one sensor configured to measure a temperature of the engine fuel.

5. The thermal management system of claim 4, further comprising a flow control valve for modulating a flow rate of the thermal fluid into the first heat exchanger based on the temperature of the engine fuel.

6. The thermal management system of claim 1, wherein the first inlet temperature requirement is at least five (5) degrees Fahrenheit (° F.) higher than the second inlet temperature requirement.

7. The thermal management system of claim 1, wherein the first heat exchanger is a fuel-cooled heat exchanger and the plurality of second heat exchangers are air-cooled heat exchangers.

8. The thermal management system of claim 1, wherein the first thermal load is one of a reduction gearbox, a variable frequency generator, one or more sumps, an accessory gearbox, or an oil-to-oil heat exchanger.

9. The thermal management system of claim 8, wherein the second thermal load is one of the reduction gearbox, the variable frequency generator, the one or more sumps, the accessory gearbox, or the oil-to-oil heat exchanger that is different than the first thermal load.

10. The thermal management system of claim 9, wherein the one or more sumps are part of a main lubrication system for providing lubrication to a component of the engine, wherein the component is at least one a compressor section or a turbine section of the engine.

11. The thermal management system of claim 10, wherein the first thermal load is the one or more sumps of the main lubrication system, and the second thermal load is the reduction gearbox.

12. The thermal management system of claim 1, further comprising a thermal fluid tank and a pump for circulating the thermal fluid through the thermal circuit to and from the thermal fluid tank.

13. The thermal management system of claim 1, wherein the thermal management system is a fuel-oil thermal management system, and the thermal fluid is an oil-based lubricant.

14. The thermal management system of claim 13, wherein at least one of the following parameters are true: the second thermal load is at least 60% of the first thermal load or the second thermal load is at least 40% of a total oil-based lubricant thermal load.

* * * * *